United States Patent
Alexiou et al.

(10) Patent No.: US 7,822,416 B2
(45) Date of Patent: Oct. 26, 2010

(54) METHODS AND SYSTEMS FOR ALLOWING GLOBAL ROAMING BETWEEN DEVICES SUPPORTED BY DIFFERENT PROTOCOLS

(75) Inventors: Triantafyllos Alexiou, Springfield, NJ (US); Kuo-Wei Chen, Bellevue, WA (US); Ramana Isukapalli, Edison, NJ (US); Thomas La Porta, Boalsburg, PA (US); Kazutaka Murakami, Freehold, NJ (US); Ming Xiong, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 520 days.

(21) Appl. No.: 10/435,015

(22) Filed: May 12, 2003

(65) Prior Publication Data

US 2004/0229608 A1    Nov. 18, 2004

(51) Int. Cl.
*H04W 4/00* (2009.01)
*H04W 40/00* (2009.01)
(52) U.S. Cl. .................. 455/432.1; 455/432.2; 455/445
(58) Field of Classification Search ............. 455/432.1, 455/432.2, 433, 445, 446, 435.1; 370/353, 370/352, 401, 466, 467; 379/219, 220.01
See application file for complete search history.

(56) References Cited

U.S. PATENT DOCUMENTS

| | | | | |
|---|---|---|---|---|
| 5,440,613 A | * | 8/1995 | Fuentes | 455/436 |
| 5,793,771 A | * | 8/1998 | Darland et al. | 370/467 |
| 6,097,950 A | * | 8/2000 | Bertacchi | 455/432.2 |
| 6,181,935 B1 | * | 1/2001 | Gossman et al. | 455/433 |
| 6,298,232 B1 | * | 10/2001 | Marin et al. | 455/413 |
| 6,311,072 B1 | * | 10/2001 | Barclay et al. | 455/552.1 |
| 6,393,014 B1 | * | 5/2002 | Daly et al. | 370/352 |
| 6,603,968 B2 | * | 8/2003 | Anvekar et al. | 455/433 |
| 6,697,620 B1 | * | 2/2004 | Lamb et al. | 455/432.1 |
| 6,741,610 B1 | * | 5/2004 | Volftsun et al. | 370/466 |
| 6,785,730 B1 | * | 8/2004 | Taylor | 709/230 |
| 6,885,658 B1 | * | 4/2005 | Ress et al. | 370/352 |

(Continued)

FOREIGN PATENT DOCUMENTS

EP    0 583 137 A2 *    2/1994

*Primary Examiner*—George Eng
*Assistant Examiner*—Brandon J Miller
(74) *Attorney, Agent, or Firm*—Capitol Patent & Trademark Law Firm

(57) ABSTRACT

Techniques are provided to allow global roaming between different devices in different networks, using different protocols. A system may contain one or more protocol dependent logic servers (PDLSs), in which each PDLS is associated with a particular network/network protocol. The networks may comprise one or more wired telecommunications networks, wireless communications networks, or Internet-based networks. When a first PDLS receives an incoming, protocol-dependent message comprising a first protocol from a first network intended for a user currently registered on another network, the first PDLS converts the protocol-dependent message into an incoming, protocol-independent message and forwards it to another network element, such as a core logic server (CLS). The CLS processes the incoming, protocol-independent message, generates an appropriate outgoing protocol-independent message and forwards this message to a second PDLS. The second PDLS converts the outgoing, protocol-independent message to an appropriate outgoing, protocol-dependent message and forwards it to a second network operating using a second protocol. The conversion of incoming, protocol-independent messages into outgoing, protocol-independent messages eventually enables a link to be established between the two networks operating using different protocols.

34 Claims, 5 Drawing Sheets

U.S. PATENT DOCUMENTS

| | | |
|---|---|---|
| 6,950,876 B2 * | 9/2005 | Bright et al. ................. 709/230 |
| 6,963,583 B1 * | 11/2005 | Foti ........................... 370/467 |
| 2002/0183060 A1 * | 12/2002 | Ko et al. ..................... 455/432 |
| 2003/0157938 A1 * | 8/2003 | Haase et al. ................ 455/445 |
| 2003/0165135 A1 * | 9/2003 | Itzkovitz et al. ............. 370/352 |
| 2003/0166403 A1 * | 9/2003 | Hammer et al. ............. 455/445 |
| 2004/0176074 A1 * | 9/2004 | Radpour .................. 455/414.1 |
| 2004/0228324 A1 * | 11/2004 | Alexiou et al. ............... 370/352 |

* cited by examiner

METHODS AND SYSTEMS FOR ALLOWING GLOBAL ROAMING BETWEEN DEVICES SUPPORTED BY DIFFERENT PROTOCOLS

BACKGROUND OF THE INVENTION

The growth of wireless communications has freed users from the shackles of traditional landline telephone devices. Although wireless networks helped create "mobile terminals" (or more generally "mobile devices"), e.g. wireless phones, even this level of mobility does not meet some users' personal mobility. Users are not truly free to roam wherever they desire and still be able to place a call. Users can only use a mobile device/terminal (hereafter both "device" and "terminal" will be used synonymously) within a specified geographic region serviced by the user's network provider. If the user ventures outside the coverage area of her network, or if the user roams into another area serviced by a different network, the user is unable to complete a call.

"Seamless global roaming" is a desirable feature to users of wireless terminals. Simply stated, seamless global roaming allows users to roam across networks using different technology protocols. Seamless global roaming, however, presents several new challenges for communications networks. The main challenge is protocol conversion by a so-called "home location register" (HLR) as a mobile terminal moves between networks having different "mobility management" protocols. One solution for seamless global roaming includes standardizing the signal translations between today's predominate telecommunications protocols: the American National Standards Institute-41 (ANSI-41) and the Global System for Mobile Communications (GSM). The proposed solution is based on a one-to-one mapping between the two protocols. This solution, however, is unable to accommodate the introduction of new protocols, such as "session initiation protocol" (SIP). SIP, which allows for call deliveries between the Internet and other networks, has been gaining favor in the telecommunications industry. SIP is being used with increasing frequency because it is capable of supporting mobility over the Internet as well as over public switched telephone networks (PSTNs).

Today, a user operating a mobile terminal within a network she is visiting may receive service (e.g., wireless telephone service) even though the service is being provided by different service providers from the ones the user is registered with, provided the correct protocol is used to handle her calls. In a GSM network, roaming is facilitated by inserting a subscriber identity module (SIM) card into the terminal. The SIM helps the network identify a "subscriber" and locate the appropriate service profile. The SIM card works well for subscribers roaming in wireless GSM networks. However, the SIM card approach does not support roaming between wireless and wireline networks, or between networks operating under different protocols.

Another approach to facilitate global roaming is the use of intelligent networks (IN). Intelligent networks were introduced to enhance personal communications services, such as voice messaging, data, image, and video communications and to allow interworking between wireless and wireline networks. Global roaming was supposed to be supported in INs by assigning each subscriber a "universal personal telecommunications" (UPT) number. A service provider maps assigned UPT numbers to mobile or PSTN phone numbers. However, in the case of mobile terminals, once the provider's service control point (SCP) obtains a mapped number, an additional translation is required. A HLR must be interrogated to obtain a routing number for the mobile phone number of the subscriber in order to complete a call. This additional interrogation requirement increases the cost and complexity of the service.

Another concern is integrating the SIP protocol into existing telecommunications networks while maintaining global roaming. SIP allows for the delivery of calls between the Internet and wireless networks through SIP/PSTN gateways. The GSM/ANSI-136 Interoperability Team (GAIT) defined a new functionality called "interworking and interoperable functionality" (IIF) that is used to support global roaming. An intermediary agent, known as an IIF translator, translates messages between the GSM and ANSI-136 protocols. The IIF translator uses two databases, one for each subscriber profile for each protocol, to translate between the two protocols. The complexity of scaling such a one-to-one system by adding n protocols increases by at least $n^2$. For example, adding SIP to such a systems would require adding two additional IIF translators. Adding n additional protocols to such a system would require at least $n^2$ additional IIF translators. This makes deployment difficult and expensive, since several different IIF translators would have to be modified.

Thus, there is a need in the art for techniques that allow communications between wired and wireless networks which are operating using different protocols. In particular, there is a need in the art for simple and inexpensive techniques that support multiple, protocol interfaces to allow global roaming across a number of diverse networks.

SUMMARY OF THE INVENTION

Generally described, the invention comprises one or more protocol dependent logic servers (PDLSs), in which each PDLS is associated with a particular communications network and, in particular, with a protocol associated with a particular network. The communications network may either be wired or wireless, or an Internet-based network. When a first PDLS receives an "incoming, protocol-dependent" message (referred to as such because it is derived from a network using a specific protocol) originating from a first network, which is intended for a recipient currently registered in another network, the first PDLS converts the protocol-dependent message into an "incoming, protocol independent" message and forwards this message to another network element, such as a core logic server (CLS). The CLS processes the incoming, protocol-independent message, generates an outgoing, protocol-independent message and forwards the outgoing message to a second PDLS. The second PDLS converts the received message to an "outgoing, protocol-dependent" message, and forwards it onto a second communications network, which in turn then completes the message delivery to its' intended recipient. When the message is received by a device, etc, operating in the second network, the device may initiate a return, incoming protocol-dependent message. This return message is treated much like the first, incoming protocol-dependent message. The conversion of incoming, protocol-independent messages into an outgoing, protocol-independent messages eventually enables a link to be established between the two networks operating using different protocols.

The various aspects of the present invention may be more clearly understood and appreciated from a review of the following detailed description of the invention and by reference to the appended drawings and claims.

DETAILED DESCRIPTION OF THE INVENTION

The present invention is typically embodied in a Multiple Protocol Home Location Register (MP-HLR) that performs mobility management, user profile management, and authentication for subscribers roaming between different network types. A MP-HLR provides these functions using a COPS protocol to provide interworking and to support global roaming across multiple networks. It should be noted that a MP-HLR can support both wireless and wireline networks as well as Internet-like networks.

A MP-HLR and its' associated COPS protocol provide seamless global roaming across protocol-dependent networks while supporting both mobile and fixed communications terminals. A subscriber is able to roam across networks ranging from wireline PSTN networks, 2G wireless networks, and IP networks to 3G networks and still receive the same services. Similarly, a calling party, who wants to access a subscriber, need only know one of the subscriber's personal addresses. A MP-HLR with COPS protocol eliminates the need for calling parties to know the network where a subscriber is currently roaming.

Figure 1:
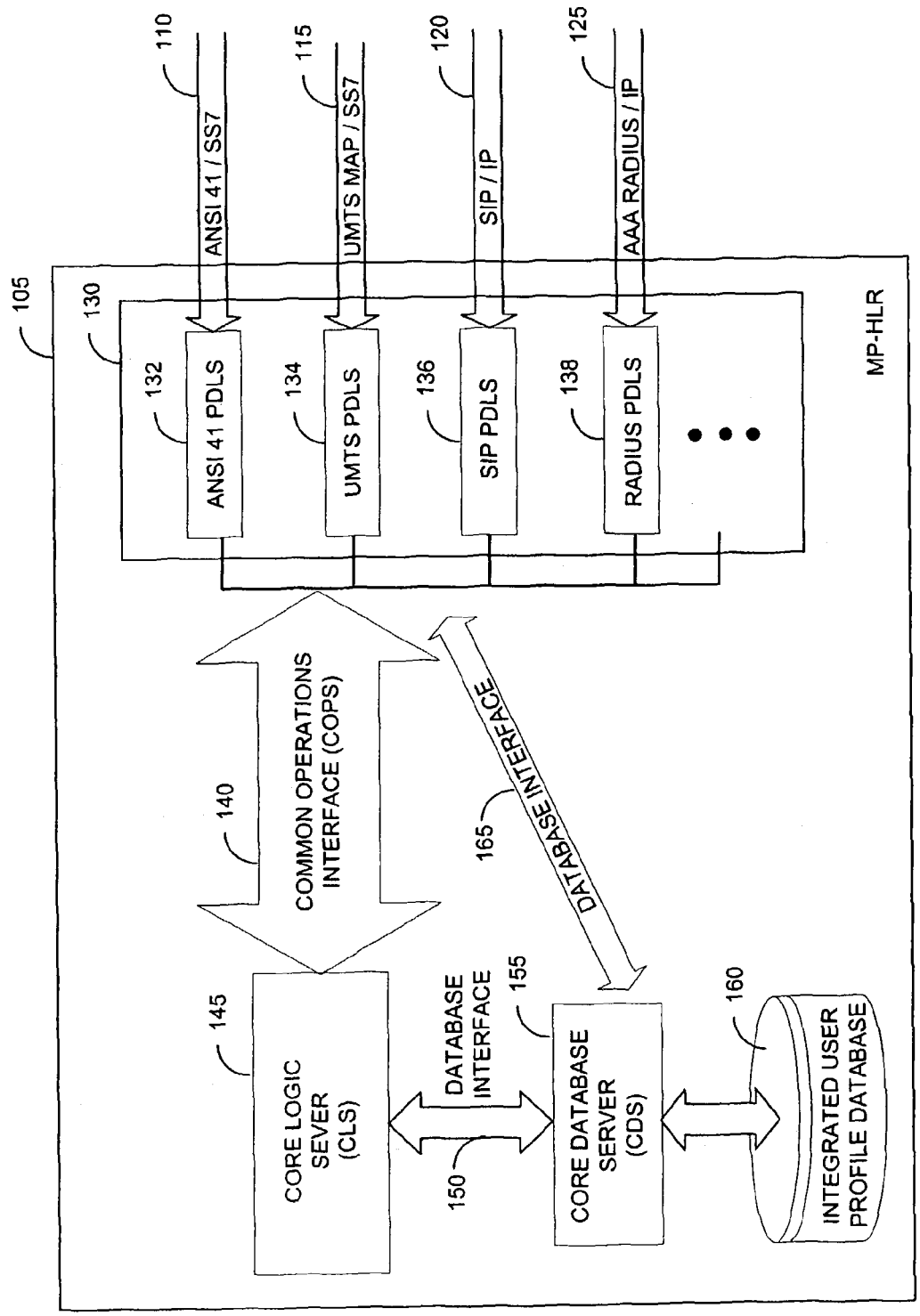
FIG. 1 is block diagram of an architecture according to one embodiment of the present invention.

Turning now to the figures, in which like numerals refer to like elements through the several figures, FIG. 1 is an illustration of an exemplary architecture for a Multiple Protocol Home Location Register (MP-HLR) 105 using a COPS architecture according to one embodiment of the present invention. As depicted in FIG. 1, the COPS architecture comprises a CLS 145 and a PDLS unit 130. The PDLS unit 130 typically comprises several protocol-dependent PDLSs to accommodate multiple networks using different protocols. For example, FIG. 1 shows the PDLS unit 130 comprising an ANSI-41 PDLS 132, a Universal Mobile Telecommunications System (UMTS) PDLS 134, a Session Initiation Protocol (SIP) PDLS 136 and a remote authentication, dial-in user service (RADIUS) PDLS 138. It should be noted that the PDLS unit 130 can support both "circuit" and "packet" switching and can provide voice and data services. Although only four PDLSs are shown in the figure, individuals skilled in the art will appreciate that the PDLS unit 130 can support other wireless and wired PDLSs operating under the same or different protocols. The PDLS unit 130 may be modular in design so that other PDLSs may be added as needed.

Each PDLS 132, 134, 136, and 138 supports a different protocol. If a PDLS receives a request for service that does not require interworking with another network, the PDLS provides the requested service directly without invoking the CLS 145. However, if the service requested requires interworking between more than one communications network, the appropriate PDLSs access the CLS 145 through a COPS interface 140. The PDLSs 132, 134, 136, and 138 first converts a "protocol-dependent" message to a "protocol-independent", COPS message. The COPS interface 140 defines a plurality of COPS messages that are used to communicate between the individual PDLSs and CLS 145. The CLS 145 also provides some protocol-independent services and determines whether interworking between the various PDLSs is required. If the CLS 145 determines that interworking is necessary, the CLS 145 communicates with a target PDLS. However, if the CLS 145 determines that interworking between different protocols is not required, then the CLS 145 may still use some COPS messages to achieve a particular service. In this case, a COPS message is sent to a PDLS which has the same protocol as the originating PDLS.

A feature of the MP-HLR 105 is that each PDLS 132, 134, 136, and 138 need only be able to communicate using their own protocol-dependent messages and only one additional protocol; the protocol-independent COPS messages. No knowledge of any other protocol is required. Multi-protocol handling and decisions on interworking are handled only by the CLS 145, making the COPS architecture modular in nature. This allows new protocols to be added without any changes being made to the existing PDLSs, which, in turn, reduces the complexity and expense of a given system to a function of n. This provides an improvement over existing architectures that require separate interworking functions between potential protocols.

Each protocol-dependent PDLS may receive protocol-dependent messages from network elements such as a visiting location register (VLR), a Gateway Mobile Switching Center (GMSC), or the like. For example, the ANSI-41 PDLS 132 receives messages in ANSI-41/SS7 110 protocol, the UMTS PDLS 134 receives messages in UMTS Mobile Application Part (MAP)/SS7 115 protocol, while the SIP PDLS 136 receives messages in SIP/IP 120 protocol. Upon receiving a protocol-dependent message, the PDLS unit 130 translates the protocol-dependent message into a protocol-independent COPS message to enable several features that support protocol interworking. These features include Location Registration, Call Routing and Delivery, and Short Message Services. A cross-reference list of some of the COPS messages and the equivalent messages for ANSI-41, UMTS, and SIP protocols are listed in Table 1.

TABLE 1

COPS messages and equivalent messages for several protocols.

| FEATURE NAME | COPS MESSAGE | ANSI-41 MESSAGE | UMTS MAP MESSAGE | SIP OPERATION |
|---|---|---|---|---|
| Location Registration | Register Terminal | Registration Notification | Update (GPRS) Location | REGISTER |
|  | Cancel Terminal Registration | Registration Cancellation | Cancel Location | N/A |

TABLE 1-continued

COPS messages and equivalent messages for several protocols.

| FEATURE NAME | COPS MESSAGE | ANSI-41 MESSAGE | UMTS MAP MESSAGE | SIP OPERATION |
|---|---|---|---|---|
| Call Routing and delivery | Request Location | Location Request | Send Routing Information | INVITE |
| | Request Route Information | Routing Request | Provide Roaming Number | ALLOCATE or N/A |
| Short Message Services | Request Location for Message | Short Message Service Request | Send Routing Information for Message | NOT currently supported |
| | Request Route Information for Message | | N/A | |
| | Report Terminal Ready for Messages | Registration Notification | Update (GPRS) Location Ready for SM Note MS present Report SM delivery status | |
| | Notify_Terminal_Read_for_Messages | Short Message Service Notification | Alert Service Center | |

Continuing, CLS 145 is shown connected to a Core Database Server (CDS) 155 through a database interface 150. The CDS 155 is adapted to operate as a front-end server for an integrated user profile database 160. The integrated user profile database 160 is a central repository of user profiles for each protocol to which a user is currently subscribed. For example, if a user is subscribed to an ANSI-41 network and a SIP network, then the integrated user profile database 160 would contain two user profiles for the user: one that corresponds to the ANSI-41 network and one that corresponds to the SIP network.

In general, the MP-HLR 105 enables global roaming as follows. One of the PDLSs 132,134,136 or 138 (referred to as a "first" PDLS for clarity sake) is operable to receive a "first", incoming protocol-dependent message in a "first" protocol originating from a "first" network (e.g., ANSI-41). The first PDLS is operable to convert the first, incoming protocol-dependent message to a "first, incoming" protocol-independent message and, thereafter, forward the first, incoming protocol-independent message to a first network module (e.g., the COPS interface 140, CLS 145, or another PDLS, etc . . . ). After forwarding the protocol-independent message on, the first PDLS's work related to the incoming, protocol-independent message is done for now.

At the same time the first PDLS is receiving the first protocol-dependent message, it may also be receiving a "first, outgoing" protocol-independent message from the COPS interface 140, CLS 145 another PDLS or another network element. Upon receiving the outgoing, protocol-independent message the first PDLS is operable to convert the first, outgoing protocol-independent message into an appropriate, outgoing protocol-dependent message in the first protocol and, thereafter, forward the appropriate, outgoing protocol dependent message to the first network.

This outgoing, protocol-independent message may have been generated due to a need for a user in a second network (e.g., UMTS) to communicate with a user in the first network. The user in the second network may be operating a device or devices which use different protocols than devices being used in the first network.

Backtracking somewhat, it was mentioned above that the first, incoming protocol-independent message is forwarded on to a network module. At this point a link has not yet been created between the first network and another network. To complete the link, a second PDLS is needed.

Putting aside for now the details on how the network module operates, suffice it to say that it generates a "second, outgoing" protocol-independent message (designated as so to distinguish it from the outgoing message received by the first PDLS) upon receiving the first, incoming protocol-independent message and forwards it on to the second PDLS. The second PDLS is operable to receive the second, outgoing protocol-independent message, convert this message into an appropriate, outgoing protocol-dependent message in a second protocol, and then forward the appropriate, outgoing protocol-dependent message in the second protocol to the second network.

As was true with the first PDLS, the second PDLS may receive messages or traffic in both directions. That is to say, the second PDLS is operable to receive incoming, protocol-dependent messages of its own. In one embodiment of the invention, the second PDLS is operable to receive a "second, incoming" protocol-dependent message in the second protocol originating from the second network, convert the second, incoming protocol-dependent message into a "second, incoming" protocol-independent message and forward the second, incoming protocol-independent message to a second network module or the first network module.

Before continuing, it should be understood that the protocol-independent messages my comprise many specific message types, including but not limited to, at least one message selected from a group consisting of a terminal registration message, a call routing and delivery message, and a short message service message.

So far we have avoided speaking about the details concerning how the network module(s) handle the protocol-independent messages generated by the first and second PDLSs. In one embodiment of the invention, the first and/or second network module comprises a CLS operable to receive one or more of the incoming, protocol-independent messages and convert each received incoming, protocol-independent message into at least one outgoing, protocol-independent message. This conversion achieves one of the desires of the present invention, that is, the conversion of an incoming, protocol-independent message into an outgoing, protocol-independent message eventually enables a link to be established between networks operating using different protocols; in this case between the first and second networks referenced above.

Before getting into more specifics on how the PDLSs 132, 134,136 and 138 and CLS 145 operate some comments regarding the other components of MP-HLR 105 seem appropriate.

In general, the interface 140 comprises a COPS interface operable to transfer outgoing or incoming protocol-independent messages between the first and second PDLSs as well as PDLSs 132,134,136 and 138 and the CLS 145 while the CDS 155 is operable to manage a plurality of a user's profiles. The user database 160 is operable to store each of the user's profiles for each network associated with the user.

The CLS 145 and CDS 155 routinely work together to help determine where to route protocol-independent messages. In one embodiment of the present invention, the CLS 145 is further operable to request "user location information" from a CDS, wherein the user location information comprises information used to determine where to route a protocol-independent message. It should be understood that the user location information may or may not comprise geographical location(s) associated with a user. Instead, it may comprise topographical network information to help determine where to route a message so that it is ultimately is received by a user. An example of user location information are "user preferences". Alternatively, the CLS may further be operable to use "operational profiles" to determine where to route a protocol-independent message. One example of an operational profile is a profile which is shared by a group of people, such as a family or work force.

The CLS 145 is not the only component of MP-HLR 105 which may communicate with the user database 160. In an alternative embodiment of the invention, a PDLS, such as the first and second PDLSs and PDLSs 132,134,136 and 138 may be further operable to exchange user location information or profiles with the user database 160.

The immediate paragraphs above sought to set forth some general features and a general operation of the present invention. What follows are more detailed examples of the ideas envisioned by the present inventors. Consider the delivery of a call from a calling party operating in an UMTS network using a UMTS "directory number" (a pseudo-telephone number by which the subscriber may be reached) to a subscriber roaming in an ANSI-41 network with an ANSI-41 mobile device. The UMTS message, Send_Routing_Information, which is used to request the location of the subscriber, is forwarded to the UMTS PDLS 134. Because the message involves interworking, the UMTS message is translated to the corresponding COPS message, Request_Location. The Request_Location message typically contains information about the subscriber's UMTS/GSM account, such as the called number, terminal identification number, and the like. The UMTS PDLS 134 then forwards the Request_Location message to the CLS 145. The CLS 145 examines the Request_Location message and retrieves the subscriber's account information. The CLS 145 then forwards the subscriber's UMTS account information to the CDS 155. The CDS 155 uses the UMTS account information to access the Integrated User Profile Database 160 to retrieve the subscriber's corresponding ANSI-41 account information. The CDS 155 then forwards the subscriber's ANSI-41 account information to the CLS 145 where it is used to create a COPS Request_Route_Information message. The CLS 145 directs the COPS message to the ANSI-41 PDLS 132, where it is used to determine routing information associated with the subscriber's ANSI-41 mobile device.

The ANSI-41 PDLS 132 obtains the routing information from the ANSI gateway (serving MSC) and passes that in a Request_Route_Information_Ack COPS message to the CLS 145. The CLS 145 extracts the ANSI-41 routing information and generates a Request_Location_Ack COPS message. The CLS 145 then transmits the Request_Location_Ack COPS message to the UMTS PDLS 134, which converts it to a UMTS-specific Send_Routing_Information_Ack message. The UMTS PDLS 134 then forwards the routing information to an appropriate UMTS switch so that the ANSI-41 routing information can be forwarded to the calling party to complete the call.

The MP-HLR and COPS protocol has several advantages over existing systems. First, the COPS protocol allows for protocol extensibility. The modular design of the COPS protocol allows for new protocols with interworking capabilities to be introduced into a system without any modifications to existing PDLSs. This will be important in the future as the telecommunications industry shifts toward an IP-based environment. The modular design will allow a seamless transition from today's 1G and 2G wireless networks to next-generation wireless networks based on HLR/IP and to future all IP-based wireless networks. Furthermore, using a protocol-independent COPS interface for inter-protocol communications makes it possible to easily extend the MP-HLR by adding additional protocols as needed.

Another advantage of the COPS protocol is personal mobility across multiple protocols. A MP-HLR operating using a COPS protocol can provide personal mobility not just within a single network such as an ANSI-41 network, but across different networks, such as wireline, wireless, and the Internet. Furthermore, by having a single, integrated user profile database that spans multiple protocols, seamless global roaming is possible. For example, activation of a service on one network, e.g., call forwarding activation from a UMTS terminal, can be propagated to other networks, such as SIP or ANSI-41, subscribed to by the user.

Figure 2:
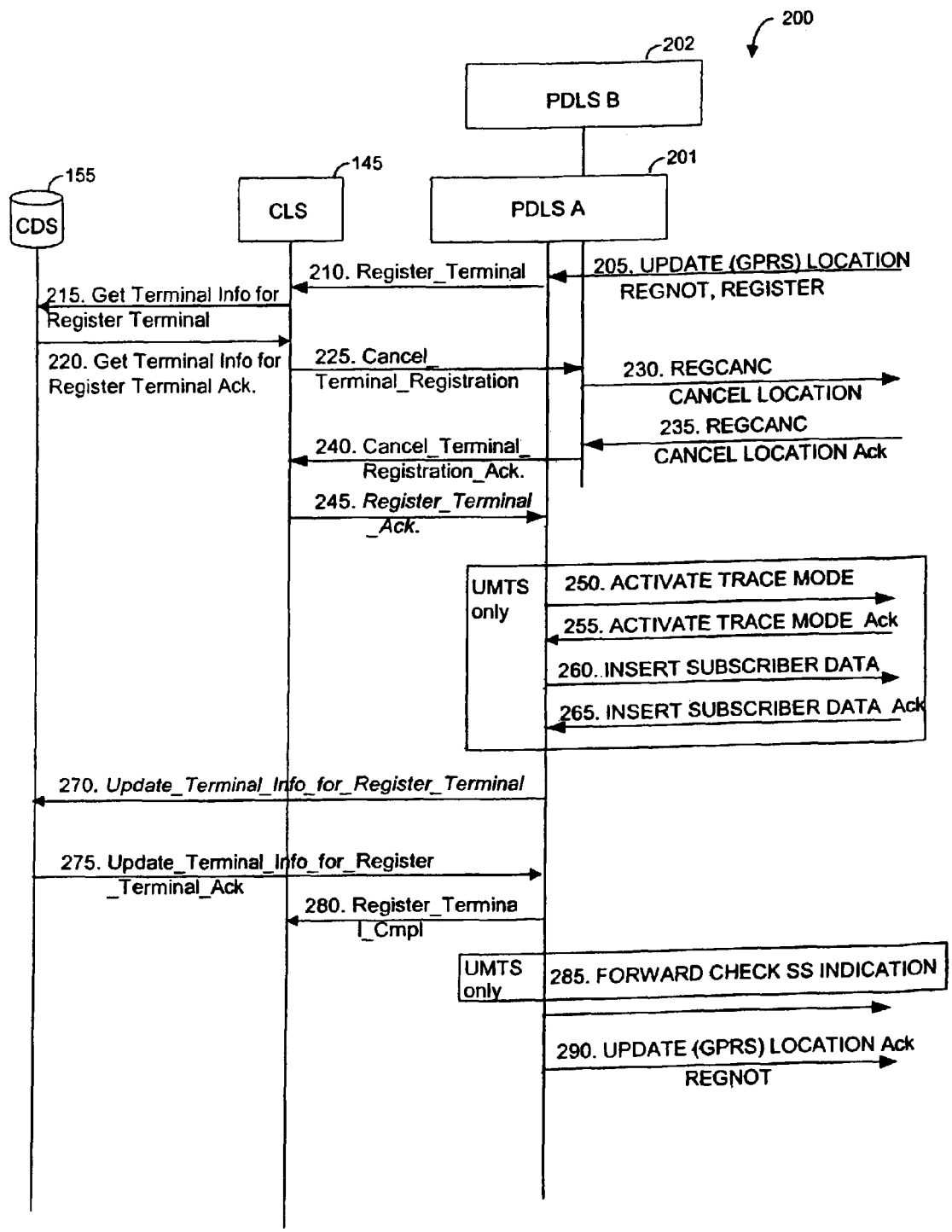
FIG. 2 is a message flow diagram illustrating a technique for registering a remote communications terminal according to one embodiment of the present invention.

FIG. 2 is a message flow diagram illustrating an exemplary terminal registration technique 200 for a Location Registration function within the COPS system 100 (FIG. 1). The terminal registration technique 200 is invoked when a terminal is powered up, when a location update function is performed, or when a terminal moves from one location serviced by one VLR to a different location serviced by a different VLR.

Technique 200 begins at 205 when a registration request is sent from a subscriber's terminal to PDLS A 201. It should be noted that PDLS A 201 maybe an ANSI-41, UMTS, or a SIP PDLS or another PDLS. For example, if the terminal is in a network that uses ANSI-41-specific messages, the VLR of the ANSI network will forward the ANSI-41 registration request REGNOT to PDLS A 201 to initiate the registration process. Similarly, if the terminal uses UMTS-specific messages, then the VLR for UMTS will send the UMTS registration request UPDATE LOCATION to an UMTS PDLS. For each figure, the messages transferred between the PDLSs and the terminals are shown for ANSI-41, UMTS, and SIP protocols. Although only the ANSI-41, UMTS, and SIP protocols and PDLSs are discussed, those skilled in the art will appreciate that any communications protocol and an associated PDLS, for either wireless or wired telecommunications networks, may be used.

Upon receiving the registration request, PDLS A 201 converts the registration request from the appropriate protocol to a Register_Terminal COPS message. Typically, every COPS message contains an Activity Reference Value (ARV) parameter, and a COPS version parameter. The ARV parameter is a unique identifier of an activity performed in the COPS interface. An activity is a unit of tasks that are applied over a distributed entity in the COPS interface. Typically, the tasks are distributed between the CLS 145 and PDLS A 201. The ARV parameter includes a client type field, client ID field, and an activity reference ID field, which is a unique value associated with a particular client. The COPS versions parameter is an internal parameter, which is used to identify the version number of the COPS software and is used to ensure compatibility. Some of the parameters included in the Register_Terminal COPS message are summarized in Table 2.

TABLE 2

Key parameters in Register_Terminal COPS message.
Parameter name

Terminal ID (e.g., IMSI, MIN, SIP URL, etc.)
Originating Network Protocol Type (UMTS, ANSI-41, SIP, etc.)
Service Type (Circuit switching or packet switching)
Location Information (MSC address, VLR number, SGSN number, a SIP host address, etc.)
Terminal Serial Number (e.g., ESN)
Message Waiting Flag At 210, the PDLS transmits the Register_Terminal COPS message to the CLS 145. The CLS 145 receives the message and generates a message to query the CDS 155 for the terminal information at 215. The CDS 155 uses the query to retrieve the appropriate terminal information from the Integrated User Profile Database 160 for the subscriber. Next, the terminal information is downloaded to the CLS 145 at 220.

At 225, the CLS 145 determines whether the subscriber has a terminal registered in any network. For example, in networks that support UMTS or ANSI-41 protocols, multiple terminal registrations are not permitted. Therefore, if a subscriber currently has a terminal registered in either an ANSI-41 network or a UMTS network it should be cancelled before a new registration can be completed. The CLS 145 will de-register the terminal from the previous location. The CLS 145 generates a Cancel_Terminal_Registration COPS message and forwards it to the PDLS B 202. A summary of some of the parameters for the Cancel_Terminal_Registration COPS message is provided in Table 3.

TABLE 3

Key parameters in Cancel_Terminal_Registration COPS message.
Parameter name

Terminal ID (e.g., IMSI, MIN, SIP URL, etc.)
Service Type (Circuit switching or packet switching)
Location Information (MSC address, VLR number, SGSN number, SIP host address, etc.)
Terminal Serial Number (e.g., ESN)

At 230, PDLS B 202 generates a protocol-dependent message to the communications gateway to cancel the registration of the terminal from the communication network associated with PDLS B 202. Next, at 235, the previous serving-VLR sends an acknowledgement message to the PDLS B 202 to indicate that the terminal was de-registered from the network. At 240, PDLS B 202 sends a Cancel_Terminal_Registration_Ack COPS message to the CLS 145 acknowledging that the terminal registration has been cancelled. A summary of some of the parameters for the Cancel_Terminal_Registration_Ack COPS message is shown in Table 4.

TABLE 4

Key parameters in Cancel_Terminal_Registration_Ack COPS message.
Parameter name

Message Waiting Flag
Return value (Success, Failure, Cancellation Denied, etc.)

At 245, the CLS 145 acknowledges the registration of the terminal with PDLS A 201 by generating the common operations message Register_Terminal_Ack. The subscriber's profile, which was returned from the CDS 155, is included in the Register_Terminal_Ack COPS message. A summary of some of the parameters included in the Register_Terminal_Ack COPS message is shown in Table 5.

TABLE 5

Key parameters in Register_Terminal_Ack COPS message.
Parameter name

Mobile Directory Number (telephone number)
Message waiting data (MNRF, MNRR, MSISDN-Alert, SMSDPF, MC-list, etc.)
Interworking Message Waiting flag
Terminal Profile
Return value

250 through 265 are used only when the terminal is registered in a UMTS network to activate a trace mode and copy the subscriber's data to the UMTS serving-VLR (not shown). At 270 PDLS A 201 updates the location of the newly registered terminal by forwarding the location information directly to the CDS 155, which updates the user profile in the Integrated User Profile Database 160. Once the update is complete, the CDS 155 sends an acknowledgement message to PDLS A 201. Finally at 280, PDLS A 201 generates a Register_Terminal_Cmpl COPS message and forwards it to the CLS 145 in case any short messages need to be delivered to the terminal from message centers of a different network type, signaling the completion of the terminal registration. A summary of some of the parameters for the Register_Terminal_Cmpl COPS message are shown in Table 6.

TABLE 6

Key parameters in Register_Terminal_Cmpl COPS message
Parameter name

Return Value (Success, Failure, etc.)

Lastly, at 290, the PDLS A 201 generates a protocol-specific message to the communications network gateway to update the location of the terminal. However, if PDLS A 201 is associated with the UMTS network, then at 285, PDLS A 201 generates a UMTS-specific message to pass an indicator to the UMTS gateway.

Figure 3:
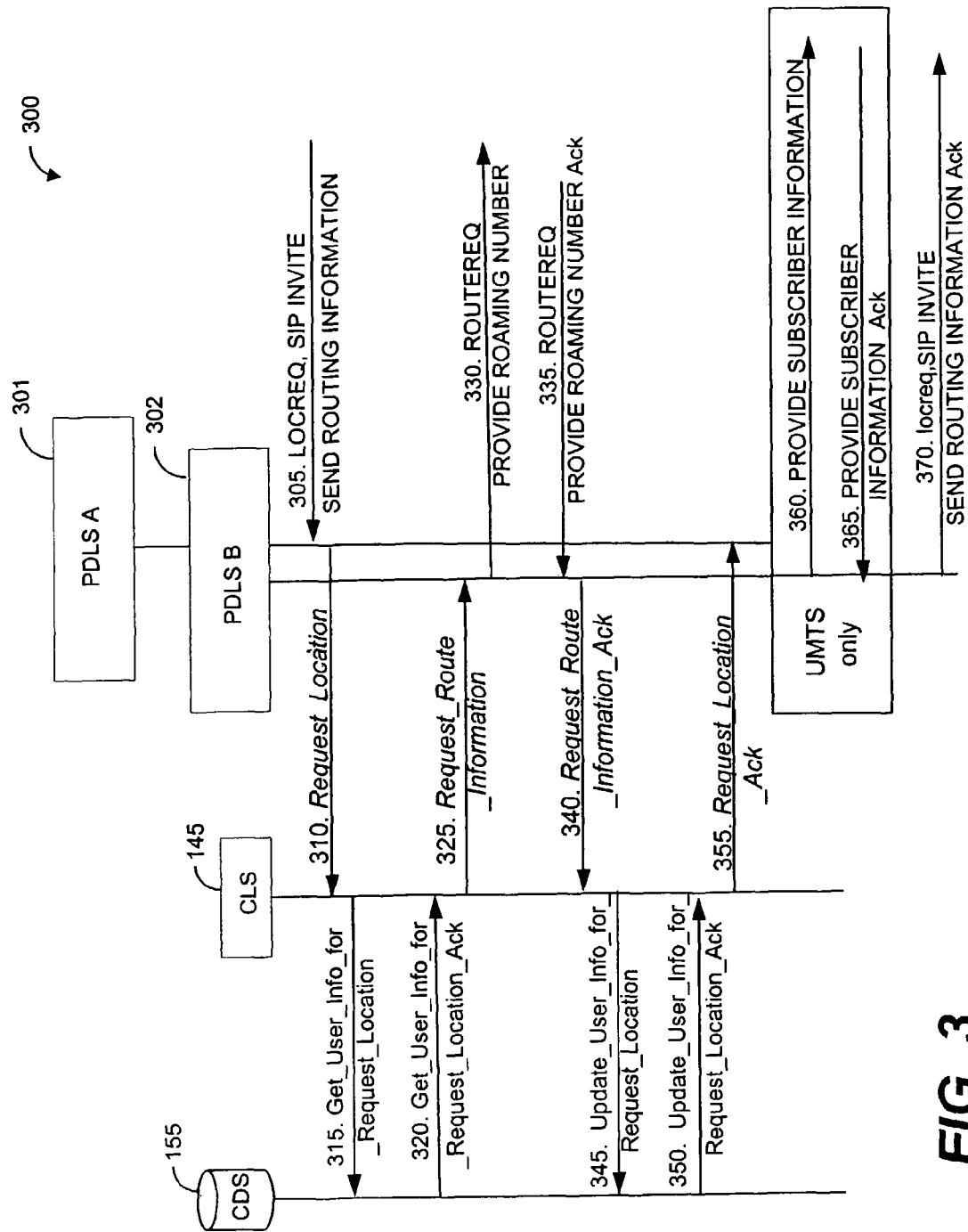
FIG. 3 is a message flow diagram illustrating a technique for routing a call between different networks according to one embodiment of the present invention.

FIG. 3 is a message flow diagram illustrating an exemplary technique 300 for call routing and the delivery of voice services between two different communication networks according to one embodiment of the present invention. Technique 300 begins at 305 when a request is received for the location of the terminal or subscriber to deliver a call by PDLS A 301. The request is received from the communications network containing the origination address (e.g., directory number, SIP URL, etc.) and is sent to the communications network where the terminal or subscriber is served. For example, the origination address may be in a communications network operating under an ANSI-41 protocol while the destination address is located in a UMTS network. The request is in the protocol corresponding to a subscriber's destination address (i.e., called "party number"). For example, a subscriber may receive a call on a network supporting the UMTS protocol while he or she is logged into a communications network supporting the ANSI-41 protocol. The UMTS gateway (not shown) generates a UMTS-specific terminal location request message and forwards it to the UMTS PDLS.

At 310 the PDLS A 301 translates the protocol-dependent message to the common operations message, Request_Location, and forwards it to the CLS 145. The Request_Location message is used to acquire the current location, e.g., network address (IP address), or a routing number (TLDN/MSRN) of a terminal. A summary of some of the parameters used in the Request_Location_Request COP message is provided in Table 7.

TABLE 7

Key parameters in Request_Location COPS message.
Paramater name

Originating Network Protocol Type (ANSI41, UMTS, SIP, etc.)
Destination Information (MDN, MSISDN, SIP URL, etc.)
Originating System ID
Calling party number
Call ID (Billing ID, Call reference number, etc.)

At 315 the CLS 145 forwards a request to the CDS 155 for terminal information. The CDS 155 examines the request and generates a query to the integrated user profile database 160 requesting the terminal location information for the network where the terminal is currently registered. The CDS 155 then returns the terminal location information to the CLS 145 at 320.

Steps 325 through 340 are invoked only if a temporary routing number is required to deliver the call. Steps 325 through 340 are not required if both the subscriber and the caller are operating within an Internet environment (e.g., a SIP to SIP connection). However, steps 325 through 340 are required if at least one of the parties is in a telecommunications network (e.g., SIP to ANSI-41 connection, etc.). Therefore, upon receiving the terminal information from the CDS 155 at 320, the CLS 145 determines whether at least one of the parties to the connection are located in a telecommunications network, such as a cellular network, a PSTN, or the like. If at least one party is in a telecommunications network then CLS 145 generates a COP message called Request_Route_Information. The Request_Route_Information COPS message is sent to the PDLS B 302 to request temporary routing information for the terminal. Some of the parameters for the Request_Route_Information message are shown in Table 8.

TABLE 8

Key parameters in Request_Route_Information COP message.
Parameter name

Terminal ID (e.g., IMSI, MIN, SIP URL, etc.)
Current location information (MSC address, VLR number, SGSN number, SIP host address, etc.)
Mobile directory number (e.g., telephone number)
Originating Network Protocol Type (UMTS, ANSI-41, SIP, etc.)
Originating System ID TABLE 8-continued Key parameters in Request_Route_Information COP message.
Parameter name Calling party number
Call ID (e.g., Billing ID, Call reference number)
Terminal Serial Number (e.g., ESN)

At 330, PDLS B 302 converts the Request_Route_Information COPS message to a protocol-dependent message and forwards the protocol-dependent message to the corresponding communications network. At 335 the communications network returns the location of the subscriber in a protocol-dependent message to PDLS B 302. PDLS B 302 then translates the message into a Request_Route_Information_Ack COPS message at 340 and forwards it to the CLS 145. The CLS 145 places the routing information in a Request_Location_Ack COPS message at 355 and forwards it to PDLS A 301 so that the call can be successfully routed to the subscriber. Some of the parameters for the Request_Route_Information_Ack COPS message are summarized in Table 9.

TABLE 9

Key parameters in Request_Route_Information_Ack COPS message.
Parameter name

Routing number (MSRN, TLDN, etc.)
Serving system ID
Return value

Next, the CLS 145 formats the information into a COP message, known as Request_Location_Ack Message and forwards it to PDLS B 302. A summary of some of the parameters for the Request_Location_Ack. COP message is given in Table 10.

TABLE 10

Key parameters in Request Location Ack COP message.
Parameter name

Terminal ID (e.g., IMSI, MN, SIP URL, etc.)
Terminal Serial Number (e.g., ESN)
Routing Instructions
Redirection reason (e.g., call forwarding reason)
Return value
Destination List (List of the following parameters)
　　Destination type (ANSI-41, UMTS, SIP, etc.)
　　Routing information (e.g., TLDN, MSRN)
　　Serving system ID
　　Routing type (fixed telephone number, temporary routing number, etc.)
　　Termination treatment (e.g., voice mail, mobile device termination)

If PDLS B 302 is in a UMTS network, then PDLS B 302 provides the subscriber's information to the UMTS gateway at 360. Upon successfully receiving the subscriber information, the UMTS gateway generates an acknowledgement signal back to PDLS B 302. Lastly, at 370, PDLS B 302 sends an acknowledgement message that includes the routing information to the communications network associated with PDLS B 302.

As a further example of the call routing and delivery function, consider a call delivery from a UMTS network to an ANSI-41 network. A caller dials a UMTS phone number assigned to the called party, who is currently roaming in an ANSI-41 network. When the caller places the call using a UMTS directory number, an ISDN user part (ISUP) initial address message (IAM) is forwarded to an appropriate UMTS gateway MSC. The UMTS gateway MSC issues a location request message, i.e., UMTS Send_Routing_Information (SRI) message, to the UMTS PDLS at the MP-HLR. Upon receipt of the SRI message, the UMTS PDLS rationalizes the service, translates the SRI message into a protocol-independent Request_Location COPS message, and forwards the message to the CLS 145. The CLS 145 accesses the CDS 155 to determine the location where the called party is currently roaming. Once the CLS 145 determines that the user is roaming in an ANSI-41 network, the CLS 145 sends a Request_Route_Information (RRI) COPS message to the ANSI-41 PDLS 132. The ANSI-41 PDLS 132 translates the Request_Route_Information (RRI) COPS message to an ANSI-41-specific ROUTEREQ message and transmits it to the serving, visiting location register (VLR)/MSC. The VLR/MSC replies with a temporary routing number which is then sent back to the gateway MSC through the CLS 145. An ISUP IAM message is then forwarded to the ANSI-41 MSC.

Yet another call delivery example is the delivery of a call from a UMTS network to a called party roaming in a SIP network. The main difference between this example and the previous example is that a PSTN-to-IP gateway is required for signal and media translation. The equivalent of a temporary routing number in a SIP network is the user's contact address. However, the user's contact address cannot be returned to the originating party. Rather the SIP network must emulate the temporary number allocation process to deliver a call from a gateway MSC to a PSTN/IP-SIP gateway. The PSTN/IP-SIP gateway has a pool of temporary routing numbers. Upon receiving a SIP ALLOCATE message, the PSTN/IP-SIP gateway allocates one available temporary routing number and saves the association between it and the SIP contact uniform resource identifier (URI). The routing number is then sent to the SIP PDLS 136 and eventually to the gateway MSC. The gateway MSC then sends an ISUP IAM using the temporary number, which reaches the PSTN/IP-SIP gateway. The PSTN/IP-SIP gateway checks a temporary mapping table and sends a SIP INVITE message to an appropriate SIP user agent to complete the call.

The foregoing examples involved interworking between a single terminal operating in one communication network and a single terminal operating in another communication network. However, one of the more powerful advantages of using the MP-HLR and COPS interface is that the scope of global roaming can be extended to interworking between multiple terminals registered to a single subscriber, wherein each terminal operates in a different network using a different protocol. As an example of extended user mobility, suppose that a user is called by a calling party on his or her personal address, which is a UMTS directory number. The user also has an active terminal registration in the UMTS network but the terminal is unavailable and has an active terminal registration in the ANSI-41 network, but does not have an active registration in the SIP network.

When the call comes in from the UMTS gateway to the UMTS PDLS 134, the UMTS PDLS 134 converts the request to a Request_Location COPS message and sends it to the CLS 145. The CLS 145 uses the information to query the CDS 155 about the active registration for the user. The CDS 155 returns the location information for both the active UMTS terminal and the ANSI-41 terminal to the CLS 145 along with a destination selection policy that requires that delivery of the call must first be attempted to the SIP terminal, then to the UMTS terminal, and finally to the ANSI-41 terminal.

CLS 145 examines the location information received from the CDS 155 and determines that the SIP terminal is not registered and therefore discards it from further consideration. The CLS 145 then moves to the next registration (e.g., the UMTS terminal) and tries to retrieve the routing information by sending a Request_Route_Information COPS message to the UMTS PDLS 134. However, the request will fail because although the UMTS terminal is registered it is unavailable and therefore not listed in the UMTS VLR/MSC. The CLS 145 then retrieves the ANSI-41 TLDN, by generating a Request_Route_information COPS message to the ANSI-41 PDLS 132. The ANSI-41 PDLS 132 translates the COPS message to an ANSI-dependent ROUTEREQ message and forwards it to the ANSI-41 VLR/MSC. In response to the request, the ANSI-41 VLR/MSC provides the TLDN to the ANSI-41 PDLS 132, which formats it in a Request_Route_Information_Ack COPS message to the CLS 145. The CLS 145 then forwards the TDLN to the UMTS PDLS 134 are in a Request_Location_Ack COPS message. Then the UMTS PDLS 134 provides it to the UMTS gateway MSC to complete the call.

Figure 4:
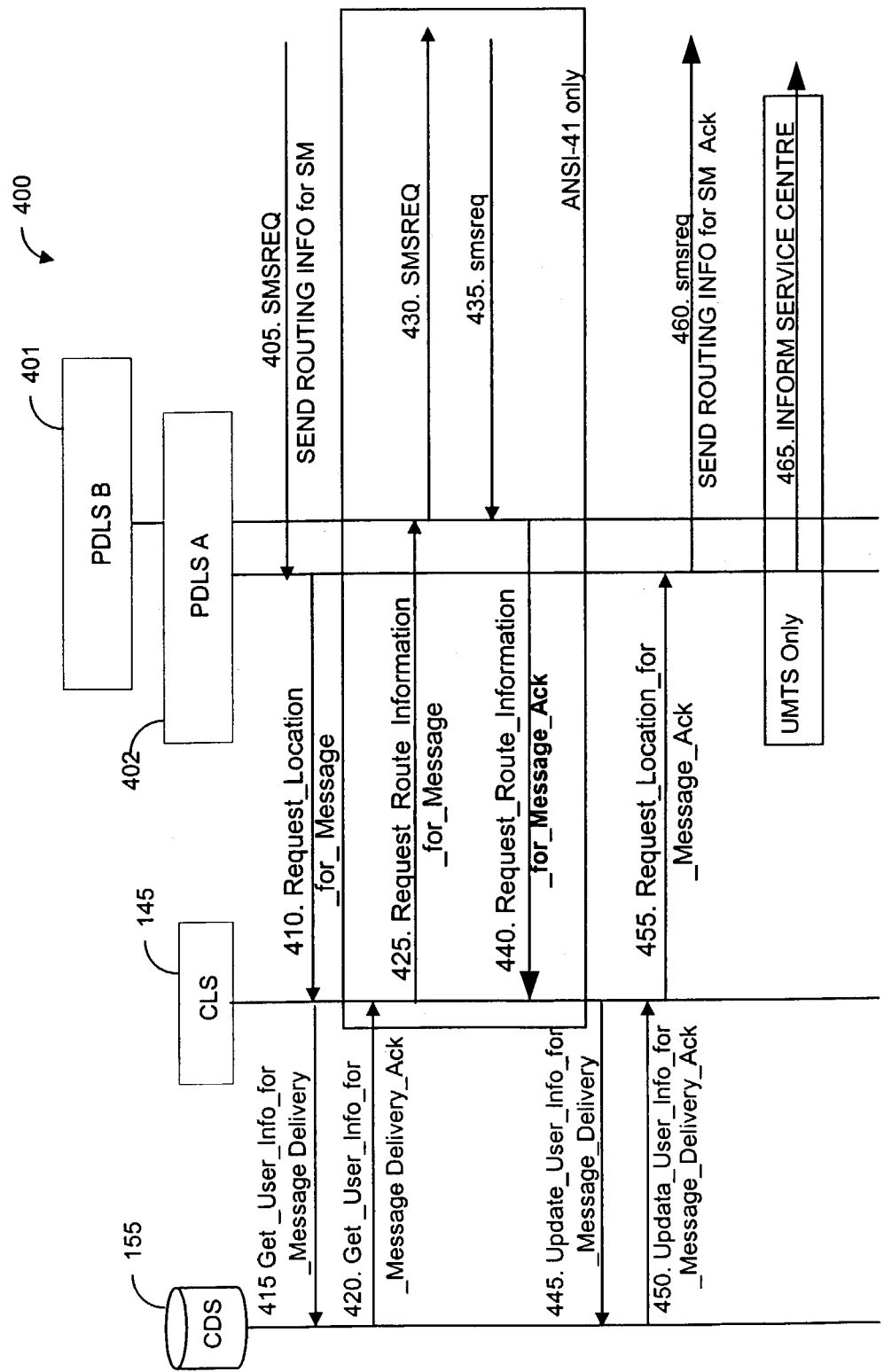
FIG. 4 is a message flow diagram illustrating a technique for Short Message delivery between different networks according to one embodiment of the present invention.

FIG. 4 is a message flow diagram illustrating an exemplary technique 400 for Short Message Delivery function between two different communication networks according to one embodiment of the present invention. Technique 400 begins at 405 when an MP-HLR 105 receives an inquiry on the current location of a subscriber's terminal for the purpose of delivering a message. The initiator of the Short Message Delivery request is a message center (MC), e.g., ANSI-41 MC or UMTS MC, located within a specific communications network. The request is received at PDLS A 402, which converts the request into a Request_Location for_Message COPS message at 410. Some of the parameters for the Request_Location for_Message COPS message are summarized in Table 11.

TABLE 11

| Key parameters in Request_Location_for_Message COPS message Parameter name |
| --- |
| Destination Information (MSISDN, MDN, etc.) |
| Originating Network Protocol Type (ANSI-41, UMTS, SIP, etc.) |
| Reguestor Address (e.g., service center address) |
| Short Message Priority (e.g., High, Low) |
| Originator Information for SM Filtering (e.g., Originating SME address) |
| Terminal Serial Number (e.g., ESN) |

At 415 the CLS 145 generates a request message to the CDS 155 to request the subscriber's (or user's) information regarding PDLS B 401 required to deliver the message to the subscriber. The CDS 155 returns the location information of the subscriber on the second communications network in an acknowledgement message to the CLS 145 at 420. The CLS 145 then determines whether a temporary routing number is required to deliver the call to the subscriber. A temporary routing number is required if either the calling party or the subscriber are located on a telecommunications network. The CLS 145 first determines whether the calling party or subscriber is located in a telecommunications network. If at least one of the parties is located in a telecommunications network, the CLS 145 generates a Request_Route_Information_for_Message COPS message and forwards it to PDLS B 401. At 430 PDLS B 401 translates the COPS message, which includes the request for routing information, into a protocol-dependent message and forwards it to communications network B. In response, communications network B sends a reply message that contains the temporary routing information for the subscriber. At 440 the PDLS B 401 converts the reply message to a Request_Route_Information_for_Message_Ack message, which contains the temporary routing information and sends it to CLS 145. Some of the parameters for the Request_Route_Information_for_Message_Ack message are given in Table 12.

TABLE 12

Key parameters in Request_Route_Information_for_Message_Ack COPS message.
Parameter name Routing Information (SMSC address, SGSN number, etc.)
Message waiting data for RLM response (MNRF, MNRG, MCEF, etc.)
Message Waiting List Update Failure Indicator
Terminal ID (e.g., IMSI, MIN, SIP URL, etc.)
MSISDN-Alert
Short message deliver flag (true or false)
Terminal Serial Number (e.g., ESN)
Return code At 455 the CLS 145 generates a Request_Location_for_Message_Ack COPS message, which contains the current routing information for the roaming subscriber and forwards it to PDLS A 402. Finally, at 460 PDLS A converts the COPS message into a protocol-dependent message and forwards it to the calling party so that the call can be successfully completed.

Figure 5:
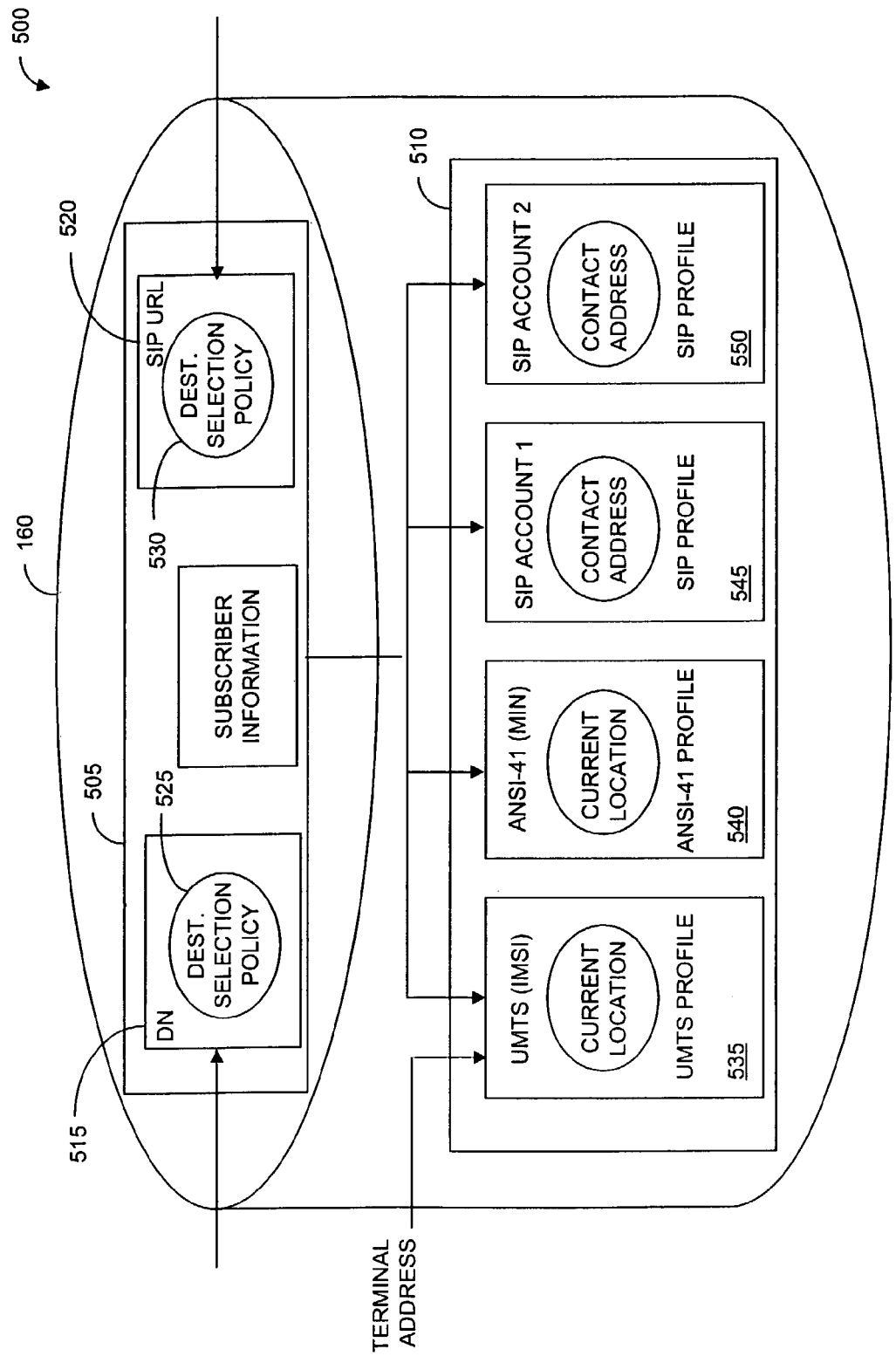
FIG. 5 is a block diagram illustrating an integrated user profile database according to one embodiment of the present invention.

FIG. 5 is an illustration of an integrated user profile database 160 for a single subscriber according to one embodiment of the present invention. The integrated user profile database 160 is divided into two parts: a user section 505 and a terminal information section 510. The user section 505 contains personal information about the subscriber, such as name, address, and other relevant information. The subscriber's personal address is used to form a key for each user record. This allows a user to have multiple personal addresses and to select a call delivery for each address. For example, a user can have one address for business purposes and another for personal usage. The business address may include many types of communications terminals, such as a personal computer, cellular telephone, pager and the like that are located at the subscriber's office, while the other address is used for the subscriber's home phone.

There are two personal addresses illustrated in FIG. 5 for the user: a directory number (DN) 515 and a SIP URL 520. Each personal address has an associated destination selection policy 525 and 530, respectively, which specifies the order in which terminals associated with the user will be called. For instance, some users may prefer to receive calls on their SIP terminal first, and if that fails, have the calls roll over to their ANSI-41 terminal.

The terminal information section 510 stores records related to the terminals registered by the user. Terminal addresses are used to form "keys" to each terminal's record. A user may register terminals operating under different protocols, as well as multiple terminals for each protocol. In FIG. 5, the terminal information section 510 contains four terminal records for the particular user: a UMTS terminal record 535, an ANSI-41 terminal record 540, and two SIP terminal records 545 and 550, respectively. Each terminal record stores specific information related to that particular terminal, such as the terminal identifier, the protocol supported by the terminal, etc. Each terminal record also stores the current location of that particular terminal. Thus, by using the user's personal addresses, the location of the registered terminals and other information related to the location of the user can be obtained and used to route calls to the appropriate terminal in the communications network where the user is roaming. Alternatively, the user may be reached by supplying the integrated user profile database 160 with the terminal address. In this case, the call will be directly routed to the terminal location specified by the terminal address.

One advantage that the integrated user profile database 160 has over existing databases is that a user's entire profile (or substantially her entire profile) for each of the user's registered terminals is stored in a single site. Thus, the integrated user profile database 160 acts as a central repository for location information for each of the user's terminals. This configuration provides for a more efficient data retrieval operation over current approaches where a user's location information is distributed across different HLRs for each protocol. By storing all of the location information for each of the user's terminal at a central location, such as the MP-HLR 105, the need to contact each HLR separately is eliminated thereby decreasing the overhead of the system.

Other alternative embodiments will become apparent to those skilled in the art to which the above-discussed exemplary embodiment pertain without departing from the spirit and scope of the present invention. Accordingly, the scope of the present invention is defined by the appended claims rather than the foregoing description.

We claim:

1. A system for allowing global roaming between devices in wired and wireless networks, comprising a first protocol dependent logic server (PDLS) associated with each network, operable to:
    receive a first, incoming protocol-dependent message in a first mobility management protocol originating from a first network;
    convert the first, incoming protocol-dependent message to a first, incoming protocol-independent message which includes a value that indicates tasks to be performed within the system;
    forward the first, incoming protocol-independent message to a first network module;
    receive a first, outgoing protocol-independent message that includes routing information for a mobile user;
    convert the first, outgoing protocol-independent message into an appropriate, outgoing protocol-dependent message in the first mobility management protocol; and
    forward the appropriate, outgoing protocol dependent message to the first network.

2. The system as in claim 1 further comprising a second PDLS operable to:
    receive a second, outgoing protocol-independent message which includes a value that indicates tasks to be performed within the system;
    convert the second, outgoing protocol-independent message into an appropriate, outgoing protocol-dependent message in a second mobility management protocol; and
    forward the appropriate, outgoing protocol-dependent message in the second mobility management protocol to a second network.

3. The system as in claim 1 further comprising a second PDLS operable to:
    receive a second, incoming protocol-dependent message in a second mobility management protocol originating from a second network;
    convert the second, incoming protocol-dependent message into a second, incoming protocol-independent message which includes a value that indicates tasks to be performed within the system; and
    forward the second, incoming protocol-independent message to a second network module.

4. The system as in claim 1 further comprising:
a core logic server (CLS) operable to:
receive one or more incoming, protocol-independent messages; and
convert each received incoming, protocol-independent message into at least one outgoing, protocol-independent message,
wherein the conversion of an incoming, protocol-independent message into an outgoing, protocol-independent message eventually enables a link to be established between networks operating using different mobility management protocols.

5. The system as in claim 1 further comprising an interface for transferring an outgoing or incoming protocol-independent message between the first PDLS and a CLS.

6. The system as in claim 2 further comprising an interface for transferring an outgoing or incoming protocol-independent message between the second PDLS and a CLS.

7. The system as in claim 1 further comprising a core database server (CDS) operable to manage a plurality of a user's profiles.

8. The system as in claim 1 further comprising a user database for storing a user's profiles for each network associated with the user.

9. The system as in claim 4, wherein the CLS is further operable to request user location information from a core database server (CDS), wherein the user location information comprises information used to determine where to route a protocol-independent message.

10. The system as in claim 4, wherein the CLS is further operable to use operational profiles to determine where to route a protocol-independent message.

11. The system as in claim 9 wherein the user location information comprises user preferences.

12. The system as in claim 1, wherein each of the protocol-independent messages comprises at least one message selected from a group consisting of a terminal registration message, a call routing and delivery message, and a short message service message.

13. The system as in claim 1 wherein the first PDLS is further operable to exchange user location information or profiles with a user database.

14. The system as in claim 1 wherein the first network comprises a network selected from the group consisting of a wired, wireless and Internet network.

15. The system as in claim 2 wherein the second network comprises a network selected from the group consisting of a wired, wireless and Internet network.

16. The system as in claim 3 wherein the second network comprises a network selected from the group consisting of a wired, wireless and Internet network.

17. A method for allowing global roaming between devices in wired and wireless networks comprising:
receiving a first, incoming protocol-dependent message in a first mobility management protocol originating from a first network at a first protocol dependent logic server (PDLS) associated with said first network;
converting the first, incoming protocol-dependent message to a first, incoming protocol-independent message which includes a value that indicates tasks to be performed by one or more of the devices within the networks at the first PDLS;
forwarding the first, incoming protocol-independent message to a first network module;
receiving a first, outgoing protocol-independent message that includes routing information for a mobile user;
converting the first, outgoing protocol-independent message into an appropriate, outgoing protocol-dependent message in the first mobility management protocol; and
forwarding the appropriate, outgoing protocol dependent message to the first network.

18. The method as in claim 17 further comprising:
receiving a second, outgoing protocol-independent message which includes a value that indicates tasks to be performed by one or more of the devices within the networks at a second PDLS;
converting the second, outgoing protocol-independent message into an appropriate, outgoing protocol-dependent message in a second mobility management protocol at the second PDLS; and
forwarding the appropriate, outgoing protocol-dependent message in the second mobility management protocol to a second network.

19. The method as in claim 17 further comprising:
receiving a second, incoming protocol-dependent message in a second mobility management protocol originating from a second network which includes a value that indicates tasks to be performed by one or more of the devices within the networks at a second PDLS;
converting the second, incoming protocol-dependent message into a second, incoming protocol-independent message at the second PDLS; and
forwarding the second, incoming protocol-independent message to a second network module.

20. The method as in claim 17 further comprising:
receiving one or more incoming, protocol-independent messages; and
converting each received incoming, protocol-independent message into at least one outgoing, protocol-independent message,
wherein the conversion of an incoming, protocol-independent message into an outgoing, protocol-independent message eventually enables a link to be established between networks operating using different mobility management protocols.

21. The method as in claim 17 further comprising transferring an outgoing or incoming protocol-independent message between the first protocol-dependent logic server (PDLS) and a core logic server (CLS).

22. The method as in claim 18 further comprising transferring an outgoing or incoming protocol-independent message between the second PDLS and a CLS.

23. The method as in claim 19 further comprising transferring an outgoing or incoming protocol-independent message between the second PDLS and a CLS.

24. The method as in claim 17 further comprising managing a plurality of a user's profiles.

25. The method as in claim 17 further comprising storing a user's profiles for each network associated with the user.

26. The method as in claim 20 further comprising requesting user location information from a core database server (CDS), wherein the user location information comprises information used to determine where to route a protocol-independent message.

27. The method as in claim 20 further comprising using operational profiles to determine where to route a protocol-independent message.

28. The method as in claim 26 wherein the user location information comprises user preferences.

29. The method as in claim 17, wherein each of the protocol-independent messages comprises at least one message selected from a group consisting of a terminal registration message, a call routing and delivery message, and a short message service message.

30. The method as in claim 17 wherein further comprising exchanging user location information or profiles with a user database.

31. The method as in claim 17 wherein the first network comprises a network selected from the group consisting of a wired, wireless and Internet network.

32. The method as in claim 18 wherein the second network comprises a network selected from the group consisting of a wired, wireless and Internet network.

33. The method as in claim 19 wherein the second network comprises a network selected from the group consisting of a wired, wireless and Internet network.

34. A system for allowing global roaming between devices in wired and wireless networks comprising:

a first protocol dependent logic server (PDLS) associated with each network operable to;

receive a first, incoming protocol-dependent message in a first mobility management protocol originating from a first network, convert the first, incoming protocol-dependent message to a first, incoming protocol-independent message which includes a value that indicates tasks to be performed by one or more of the devices within the networks, forward the first, incoming protocol-independent message to a first network module, receive a first, outgoing protocol-independent message which also includes a value that indicates tasks to be performed by one or more of the devices and routing information for a mobile user, convert the first, outgoing protocol-independent message into an appropriate, outgoing protocol-dependent message in the first mobility management protocol, and forward the appropriate, outgoing protocol dependent message to the first network; and a second PDLS operable to;

receive a second, incoming protocol-dependent message in a second mobility management protocol originating from a second network, convert the second, incoming protocol-dependent message into a second, incoming protocol-independent message which also includes a value that indicates tasks to be performed by one or more of the devices, and forward the second, incoming protocol-independent message to a second network module.

* * * * *